(12) United States Patent
Oh et al.

(10) Patent No.: US 8,336,013 B2
(45) Date of Patent: Dec. 18, 2012

(54) DETERMINING AN ORDER FOR VISITING CIRCUIT BLOCKS IN A CIRCUIT DESIGN FOR FIXING DESIGN REQUIREMENT VIOLATIONS

(75) Inventors: Nahmsuk Oh, Palo Alto, CA (US);
Peivand Tehrani, Camarillo, CA (US);
William Chiu-Ting Shu, Palo Alto, CA (US)

(73) Assignee: Synopsys, Inc., Mountain View, CA (US)

( * ) Notice: Subject to any disclaimer, the term of this patent is extended or adjusted under 35 U.S.C. 154(b) by 195 days.

(21) Appl. No.: 12/692,073

(22) Filed: Jan. 22, 2010

(65) Prior Publication Data
US 2011/0185335 A1 Jul. 28, 2011

(51) Int. Cl.
*G06F 9/455* (2006.01)
*G06F 17/50* (2006.01)

(52) U.S. Cl. ........ 716/113; 716/108; 716/112; 716/134; 703/19

(58) Field of Classification Search .................. 716/106, 716/108, 111–113, 115, 132–135; 703/19; 701/19
See application file for complete search history.

(56) References Cited

U.S. PATENT DOCUMENTS
2008/0209372 A1* 8/2008 Buck et al. ........................ 716/6
2008/0313588 A1* 12/2008 Buehler et al. .................... 716/6

OTHER PUBLICATIONS

"Gate Sizing Using Incremental Parameterized Statistical Timing Analysis", by M. R. Guthaus, N. Venkateswaran, C. Visweswariah, and V. Zolotov, IEEE @2005.*

* cited by examiner

*Primary Examiner* — Nha Nguyen
(74) *Attorney, Agent, or Firm* — Park, Vaughan, Fleming & Dowler LLP; Laxman Sahasrabuddhe

(57) ABSTRACT

Some embodiments of the present invention provide techniques and systems for determining an order for visiting circuit blocks of a circuit design for fixing design requirement violations. Fixing design requirement violations by visiting circuit blocks in this order can improve performance and quality of results. During operation, a system can determine a set of equal value segments in the circuit design. In some embodiments, the system determines equal value segments for multiple corners and combines the equal value segments to obtain the set of equal value segments. Next, the system can determine an order for visiting circuit blocks of the circuit design for fixing design requirement violations based at least on the set of equal value segments. Note that circuit block pins in an equal value segment are associated with the same parameter value, and parameter values indicate an amount or degree of a design requirement violation.

18 Claims, 11 Drawing Sheets

COMBINATIONAL CIRCUIT 400

DETERMINING AN ORDER FOR VISITING CIRCUIT BLOCKS IN A CIRCUIT DESIGN FOR FIXING DESIGN REQUIREMENT VIOLATIONS

BACKGROUND

1. Technical Field

This disclosure relates to electronic design automation (EDA). More specifically, this disclosure relates to determining an order for visiting circuit blocks in a circuit design for fixing design requirement violations.

2. Related Art

Rapid advances in computing technology have made it possible to perform trillions of computational operations each second on data sets that are sometimes as large as trillions of bytes. These advances can be largely attributed to the exponential increase in the size and complexity of integrated circuits.

To ensure that a manufactured chip will perform as desired, the circuit design is usually checked for compliance with a large number of design requirements. In fact, a circuit design is typically not manufactured until it satisfies the design requirements which can include, but are not limited to, timing requirements, noise requirements, leakage requirements, etc.

In a typical circuit design flow, a compliance checking tool is used to identify design requirement violations in a circuit design. Incremental adjustments are then made to the circuit design to fix the design requirement violations. Once the circuit design is violation free, the circuit design can be readied for manufacturing.

Note that fixing a design requirement violation may create new violations. Hence, the process of identifying and fixing violations may need to be performed multiple times before the circuit design is violation free. Furthermore, note that variations in the manufacturing process can cause variations in the characteristics of a chip. Hence, circuit designers typically ensure that design requirements are satisfied for multiple corners which represent different manufacturing process conditions and/or different operating conditions.

Today's circuit designs have a large number of gates, and often have a large number of design requirement violations. Furthermore, the design requirements typically need to be satisfied over a large number of corners. As a result, conventional techniques for fixing design violations have poor performance and poor QoR (quality of results).

SUMMARY

Some embodiments of the present invention provide techniques and systems for determining an order for visiting circuit blocks of a circuit design for fixing design requirement violations. Specifically, some embodiments determine an order for visiting circuit blocks of the circuit design based at least on a set of equal value segments for the circuit design. Fixing design requirement violations by visiting circuit blocks in this order can improve performance and QoR.

During operation, a system can analyze a circuit design to determine parameter values associated with circuit block pins or terminals. A parameter value indicates an amount or degree of a design requirement violation. For example, a parameter value associated with a pin can be the timing slack for that pin. Next, the system can determine equal value segments in the circuit design by tracing paths through circuit block pins which have the same parameter value. The system can then optionally sort the equal value segments based at least on the associated parameter values. Note that, if the equal value segments are stored in a sorted data structure, e.g., a binary search tree, the system does not need to perform the sorting operation. Next, the system can determine an order for visiting circuit blocks of the circuit design for fixing design requirement violations based at least on the sorted equal value segments. Specifically, the system can visit circuit blocks in equal value segments that are associated with a higher degree, or a greater amount of violations before visiting circuit blocks in equal value segments that are associated with a lower degree or a lesser amount of violations.

Some embodiments of the present invention determine an order for visiting the circuit blocks for fixing design requirement violations across multiple corners. Specifically, the system can determine equal value segments in the circuit design for multiple corners. Next, the system can combine the equal value segments for the multiple corners to obtain a master set of equal value segments. The system can then use the master set of equal value segments to determine an order for visiting circuit blocks in the circuit design.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
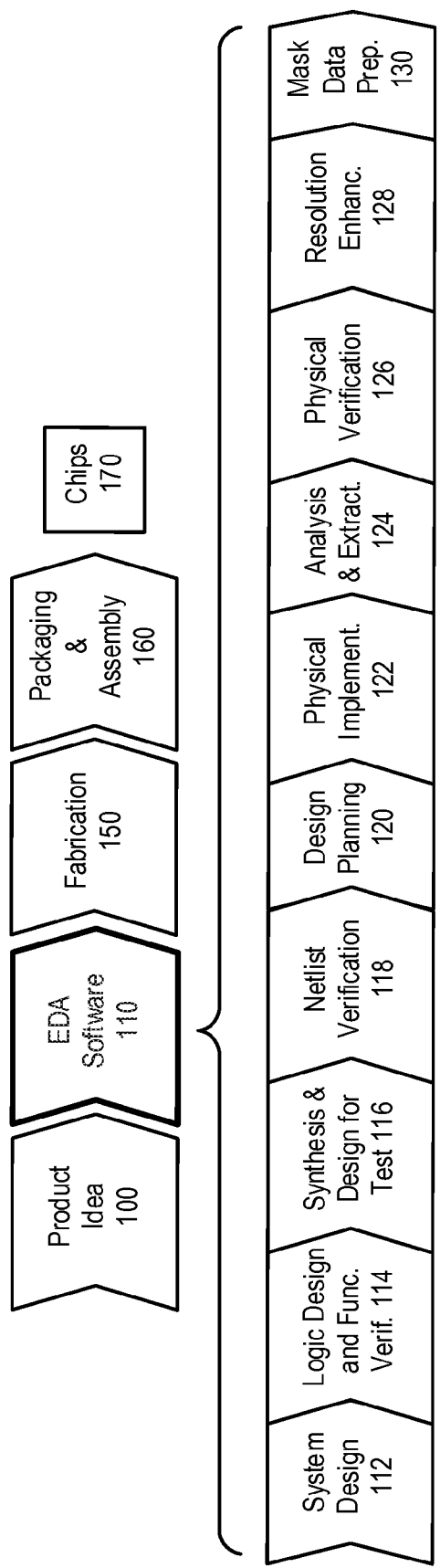
FIG. 1 illustrates various steps in the design and fabrication of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a VHDL or Verilog design can be created and checked for functional accuracy.

In the synthesis and design step 116, the VHDL/Verilog code can be translated to a netlist, which can be optimized for the target technology. Further, in this step, tests can be designed and implemented to check the finished chips. In the netlist verification step 118, the netlist can be checked for compliance with timing constraints and for correspondence with the VHDL/Verilog code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to ensure correctness for manufacturing, electrical issues, lithographic issues, and circuitry.

In the resolution enhancement step 128, geometric manipulations can be performed on the layout to improve manufacturability of the design. Finally, in the mask data preparation step 130, the design can be taped-out for production of masks to produce finished chips.

Embodiments of the present invention can be used in one or more of the above-described steps.

An important performance metric for a circuit is the clock frequency at which the circuit can reliably operate. Static timing analysis (STA) is an invaluable tool for determining whether a circuit will reliably operate at a given clock frequency. Note that, since STA uses an approximate model for the circuit, even if STA concludes that a circuit will reliably operate at a particular clock frequency, the circuit may fail to do so. Nevertheless, STA has emerged as the method of choice for verifying timing constraints for large integrated circuits because STA performs a reasonably accurate timing analysis within a reasonable amount of time.

In STA, the required times and arrival times are propagated through a graph-based representation of the circuit. Timing violations in the circuit can then be determined using the required times and the arrival times. Note that there are at least two types of timing violations: setup time violation and a hold time violation. In a setup time violation, a signal reaches a pin later than it is supposed to reach, e.g., a setup time violation may occur when a signal reaches a register input after the clock transition. In a hold time violation, a signal does not remain stable for a sufficient amount of time, e.g., a signal at a register's input may change before the register can capture the signal's value.

Once the timing violations are identified, cells in the circuit can be adjusted to fix timing violations. For example, to fix a setup time violation, one or more cells in a path can be sized-up to decrease the delay experienced by a signal that traverses the path. Similarly, to fix a hold time violation, one or more buffers can be added to a path to increase the hold time at a pin in the path.

The incremental adjustments that are made to cells in the circuit to fix timing violations are called engineering change orders (ECOs). Note that ECOs are not limited to fixing timing violations. ECOs can generally be used to fix any kind of violation, e.g., design rule check violations, noise violations, leakage violations, etc.

Figure 2:
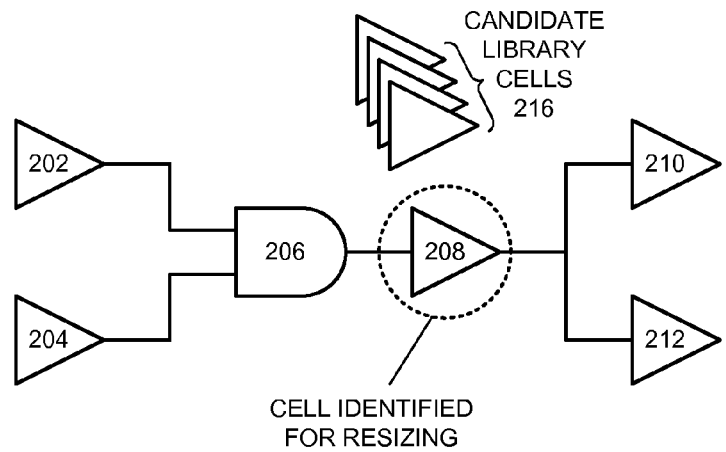
FIG. 2 illustrates how an ECO can be determined for fixing a timing violation.

FIG. 2 illustrates how an ECO can be determined for fixing a timing violation.

Cells 202, 204, 206, 208, 210, and 212 are part of a circuit design. The system may determine that cell 208 needs to be resized to fix one or more violations. For example, the system can identify cell 208 by identifying the bottleneck cell which lies on the maximum number of violating paths. Next, the system can determine the optimum cell in candidate library cells 216 to replace cell 208. For example, the system may select the smallest area cell in candidate library cells 216 which fixes the most number of timing violations. Next, the system can replace cell 208 with the optimum cell.

Conventional ECO techniques are based on a "timing path collection" approach, i.e., these techniques fix timing violations on a path-by-path basis without taking the global picture into account. Further, when an ECO is applied (e.g., by replacing a cell), all of the arrival times and required times need to be propagated throughout the circuit to ensure that further computations use the updated slack values. As a result, the slack value associated with each pin may be updated multiple times depending on the order in which the ECO technique selects the cells for applying ECOs.

Because conventional techniques do not take into account the global picture of timing violations, the quality of results produced by these techniques is poor. Further, since conventional techniques are based on path collection, these techniques can potentially take an exponential amount of time in the number of levels in the circuit design.

Figure 3:
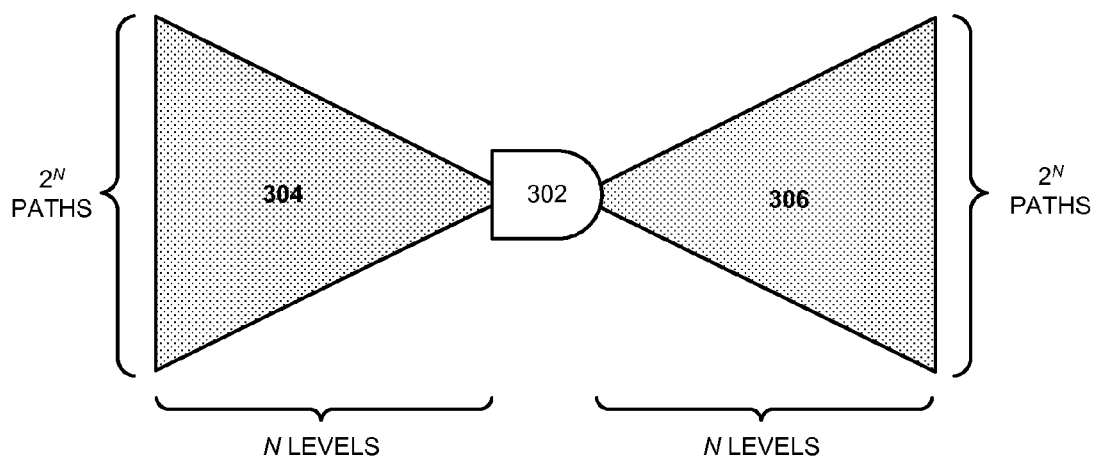
FIG. 3 illustrates why conventional ECO techniques can require an exponential amount of time in the number of levels in the circuit design.

FIG. 3 illustrates why conventional ECO techniques can require an exponential amount of time in the number of levels in the circuit design.

Suppose cell 302 has been identified for a resizing operation. Further, assume that the fan-in cone 304 and the fan-out cone 306 from cell 302 have N levels each of circuit gates. Then, the number of paths in the fan-in cone 304 and the fan-out cone 306 can be in the order of $2^N$ if we assume that each gate has two inputs in fan-in cone 304 and that the gate's output feeds two other gates in fan-out cone 306. In conventional approaches, the system may have to consider $2^N$ paths to determine which gate to resize. Further, after applying each ECO, the system may need to update arrival times in the fan-out cone 306 and update the required times in the fan-in cone 304.

Some embodiments of the present invention substantially reduce the amount of time required to perform ECOs by ordering the cells of the circuit based on a global view of the violations so that the gates need to be fixed only once, and the arrival and required times for each pin need to be updated only once.

FIGS. 4A-4E illustrate how equal slack segments can be determined for a combinational circuit in accordance with some embodiments of the present invention. Once determined, the equal slack segments can be used to determine the order in which to visit gates of a circuit design for fixing timing violations.

Figure 4A:
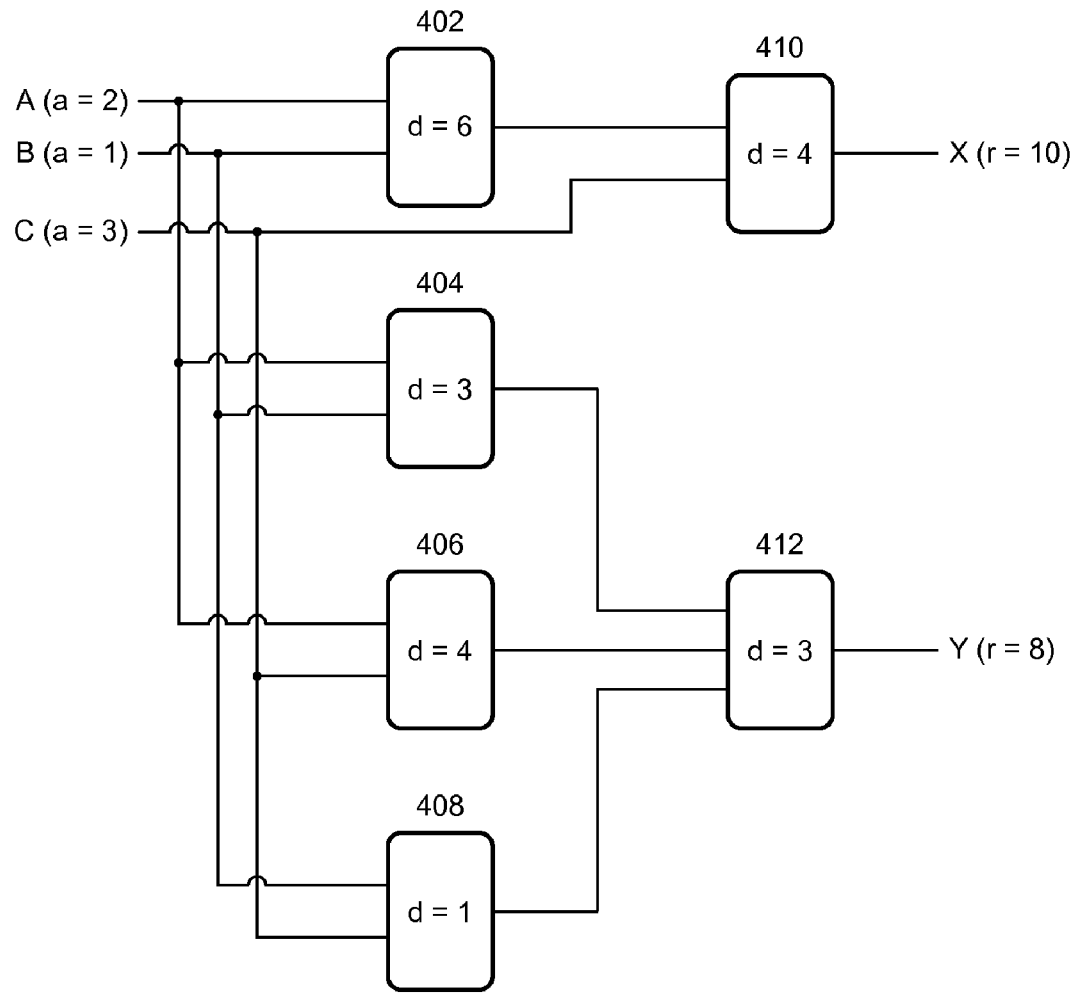
FIG. 4A illustrates a combinational circuit with delay values, arrival times, and required times in accordance with some embodiments of the present invention.

FIG. 4A illustrates a combinational circuit with delay values, arrival times, and required times in accordance with some embodiments of the present invention.

Combinational circuit 400 includes circuit blocks 402, 404, 406, 408, 410, and 412. A circuit block can be an arbitrary portion of a circuit design. Specifically, a circuit block can include one or more cells and/or one or more gates. Combination circuit 400 has three primary inputs A, B, and C, and two primary outputs X and Y. The primary outputs X and Y are also called "endpoints."

The delay for each circuit block is shown within the circuit block. For example, circuit block 402 includes text "d=6" which specifies that circuit block 402 has a delay of 6 time units (e.g., if each time unit is equal to 5 ns, then a delay of 6 time units will be equal to 30 ns). A simplified delay model has been used in FIGS. 4A-4E for the sake of clarity and ease of discourse. A more complicated delay model can have different delay values for each input/output pair. Further, the delay model can have different delay values for rise and fall transitions. Although FIGS. 4A-4E use a simplified delay model, it will be apparent to practitioners having ordinary skill in the art that techniques and systems described in this disclosure are readily applicable to more complicated delay models.

The arrival times at each primary input are shown next to the primary inputs. For example, the text "a=2" appears next to primary input A which indicates that the arrival time at primary input A is equal to 2 time units. The arrival time at a pin indicates when the signal arrives at the pin.

The required times at each primary output are shown next to the primary outputs. For example, the text "r=10" appears next to primary output X which indicates that the required time at primary output X is equal to 10 time units. The required time at a pin indicates when the signal is required to arrive at the pin.

Figure 4B:
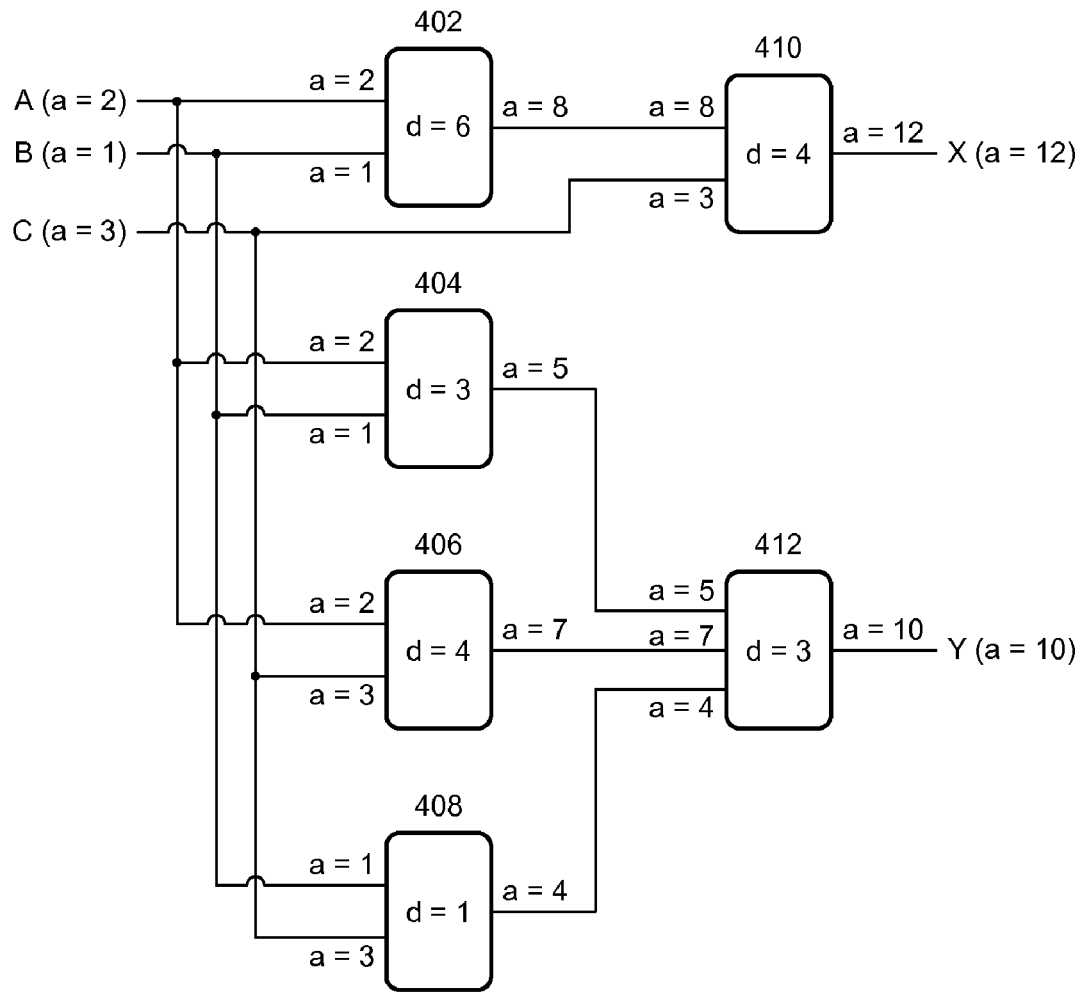
FIG. 4B illustrates how arrival times can be propagated through the circuit in accordance with some embodiments of the present invention.

FIG. 4B illustrates how arrival times can be propagated through the circuit in accordance with some embodiments of the present invention.

The arrival times are propagated from the inputs to the outputs, i.e., from the left to the right in FIG. 4B. At each circuit block, the worst-case arrival time is propagated forward. For example, the arrival times for the top and bottom inputs of circuit block 402 are 2 and 1, respectively. Hence, the arrival times at circuit block 402's output, which correspond to the top and bottom inputs, are 8 and 7, respectively. Since 8 is greater than 7, the arrival time that is propagated to circuit block 402's output is 8. In this manner, the arrival times can be propagated forward through combinational circuit 400 to produce the arrival time values shown in FIG. 4B. For example, the arrival times for the top, middle, and bottom inputs of circuit block 412 are 5, 7, and 4, respectively. Further, the arrival time for the circuit block 412's output, which is the same as the arrival time for primary output Y, is 10. Note that the above example relates to setup violations. In setup violations, the worst case delay is the largest delay. In contrast, for hold violations, the worst case delay is the smallest delay. It will be apparent to one of ordinary skill in the art that, for hold violations, a similar approach can be used to propagate the minimum arrival times.

Figure 4C:
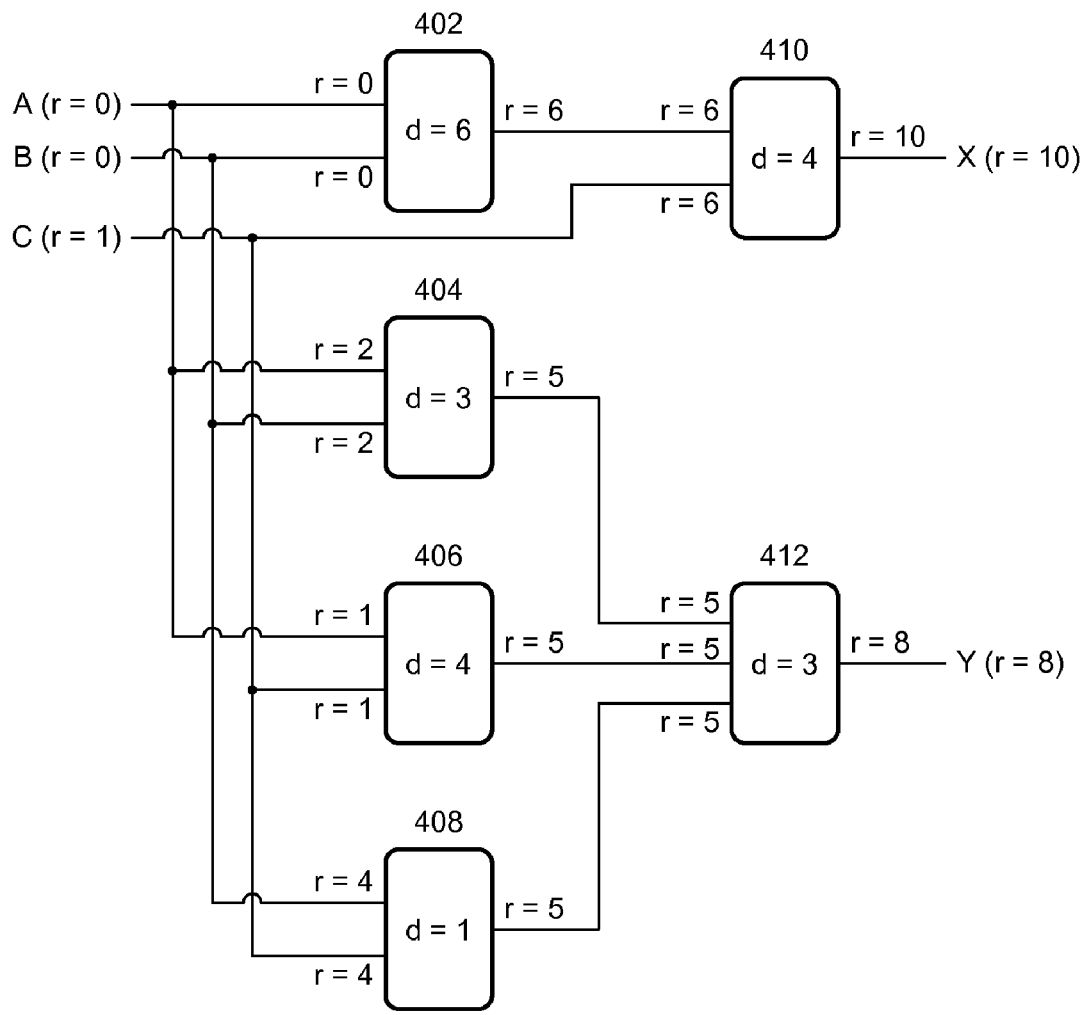
FIG. 4C illustrates how required times can be propagated through the circuit in accordance with some embodiments of the present invention.

FIG. 4C illustrates how required times can be propagated through the circuit in accordance with some embodiments of the present invention.

The required times are propagated from the outputs to the inputs, i.e., from the right to the left in FIG. 4C. For example, the required time for circuit block 410's output is 10, which is the same as the required time for primary output X. This required time is propagated back to the inputs of circuit block 410 by subtracting the delay associated with each input/output pair. For example, the required times at the top and bottom inputs of circuit block 410 are 6 and 6, respectively. Note that, if circuit block 410 had different delays for different input/output pairs, the required time values for the two inputs of circuit block 410 would be different. If multiple required times are propagated to a pin from different paths, the minimum value is assigned to the pin, which is then propagated further if needed. For example, three different required time values are propagated to primary input A: a required time of 0 from the top input of circuit block 402, a required time of 2 from the top input of circuit block 404, and a required time of 1 from the top input of circuit block 406. The required time assigned to primary input A is the minimum of these three values, namely 0. If there were more circuit blocks to the left of primary input A, this 0 value would have been propagated to them. In this manner, the required times can be propagated backward through combinational circuit 400 to produce the required time values shown in FIG. 4C.

Figure 4D:
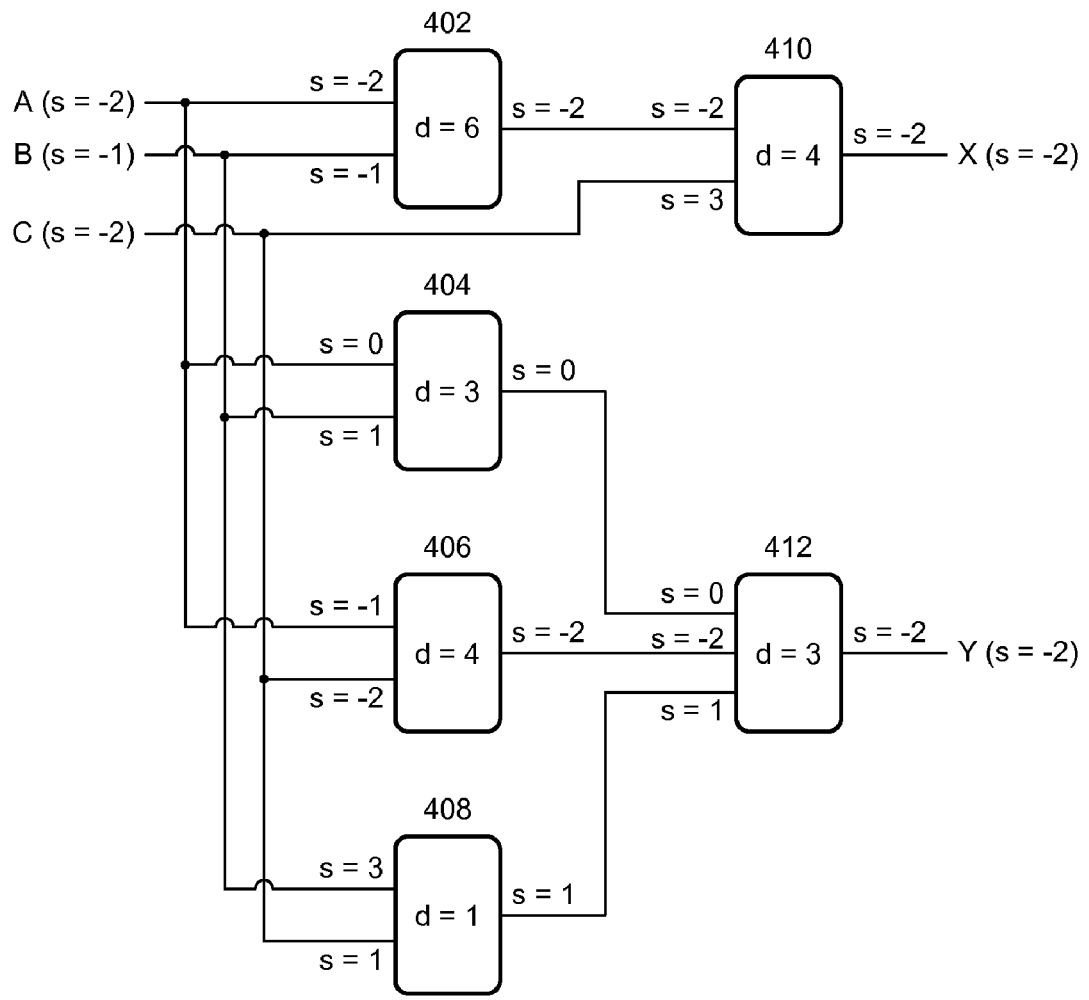
FIG. 4D illustrates how pin slack values can be determined in accordance with some embodiments of the present invention.

FIG. 4D illustrates how pin slack values can be determined in accordance with some embodiments of the present invention.

At each pin, the arrival time is subtracted from the required time to obtain the slack value. For example, the slack value at the output of circuit block 402 is equal to (6−8)=−2. Slack values for other pins can be determined in a similar fashion. The slack value indicates whether a timing constraint is being violated or not. Typically, a user can specify an acceptable slack value, i.e., a threshold. If the slack value at a pin is less than this threshold, it implies that the pin has violated a timing constraint. Note that a user can use different thresholds for different parts of the circuit. Further, the definition of a violation can depend on the type of the constraint. For example, for one type of constraint, a violation may occur if the slack value is less than the threshold, whereas for another type of constraint, a violation may occur if the slack value is greater than the threshold.

Figure 4E:
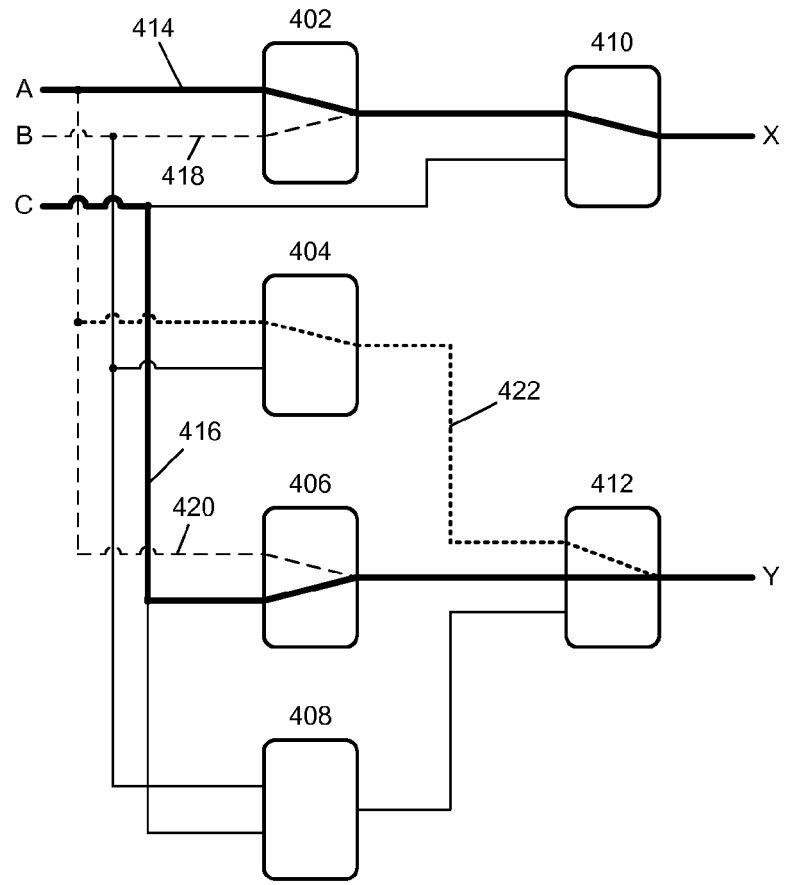
FIG. 4E illustrates how equal slack segments can be determined in accordance with some embodiments of the present invention.

FIG. 4E illustrates how equal slack segments can be determined in accordance with some embodiments of the present invention.

Once the slack values for the pins are determined, the system can determine equal value segments. An equal value segment is a sequence of pins that has the same slack value. For example, FIG. 4E illustrates equal value segments 414, 416, 418, 420, and 422. Specifically, equal value segment 414 comprises a sequence of pins with a slack value of −2; equal value segment 416 comprises a sequence of pins with a slack value of −2; equal value segment 418 comprises a sequence of pins with a slack value of −1; equal value segment 420 comprises a sequence of pins with a slack value of −1; and equal value segment 422 comprises a sequence of pins with a slack value of 0. Similarly, equal value segments for slack values 1 and 3 can be determined, but have not been shown in FIG. 4E for the sake of clarity.

In some embodiments, the system can start from an endpoint of the circuit and trace the path backward until the path reaches a primary input or the path intersects another equal value segment that is associated with a worse slack value. Next, the system can tag each branch point along the path as an endpoint of a segment, which can be traced back. For example, the system can start from primary output Y and trace the path back as shown by equal value segment 416. During this tracing back operation, the system can tag the output of circuit block 412 as a branch point where another segment can be traced. Subsequently, the system can start at the tagged output of circuit block 412 and trace back the equal value segment 422. In this manner, the system can trace back all of the equal value segments in the system. In some embodiments, the system may only trace back equal value segments that are associated with violating slack values.

Note that the time complexity for generating equal value segments is linear in the number of pins in the circuit design. This is because the equal value segments can be generated by visiting each pin exactly once. The system can use the equal value segments to determine an order for visiting cells for fixing design requirement violations, e.g., timing violations. Specifically, the system can visit cells in the equal value segments that have lower slack values before visiting the cells that have higher slack values.

Note that an endpoint of an equal value segment is one of: a primary input, a primary output, or a pin which is adjacent to another pin whose slack value is less than or equal to the slack value associated with the equal value segment. For example, the endpoints of equal value segment 416 are primary input C and primary output Y. One of the endpoints of equal value segment 422 is the top input of circuit block 404. Note that primary input A is adjacent to this endpoint, and that primary input A has a lower slack value than the slack value associated with equal value segment 422. The other endpoint of equal value segment 422 is the top input of circuit block 412. Again, note that the output of circuit block 412 is adjacent to this endpoint, and that the output of circuit block 412 has a lower slack value than the slack value associated with equal value segment 422.

This above-described property of equal value segments is important at least because of the following reason. If ECO fixes are applied by first visiting cells in equal value segments with the worst slack, and subsequently visiting cells in equal value segments with progressively better slack values, it obviates the need for updating slack information in the fan-in and fan-out cones each time an ECO is applied. This is because when a cell in an equal value segment is visited, the timing information for cells that lie beyond the endpoints of the equal value segment was already updated when the system visited these cells in a previous iteration. In other words, creating equal value segments in the circuit design, and visiting the cells according to the slack values of the equal value segments ensures that the cells are visited in an order that does not require the system to update timing information each time a cell is modified to fix timing violations.

For example, suppose the system modifies one or more cells in equal value segments 414 and 416 to fix timing violations. Now, when the system visits cells in equal value segment 422, the system will have up-to-date timing information for primary input pin A and primary output pin Y. Note that, when the system fixes timing violations in equal value segments 414 and 416, the system updates timing information for equal value segments 414 and 416 to determine whether the timing violations were fixed or not. However, the system does not have to update timing information for the rest of the circuit.

Furthermore, note that visiting cells based on the slack values of equal value segments is different from visiting cells based on the slack values of their pins. Specifically, if we visit cells based on the slack values of their pins, we may jump around the circuit in a haphazard manner. For example, a visiting order that simply takes the pin slack values into account may first visit circuit block 402 and then visit circuit block 406, and later visit circuit block 410, etc. In contrast, an ordering based on equal value segments will first visit all circuit blocks in a particular equal value segment before visiting circuit blocks in other equal value segments.

Figure 5:
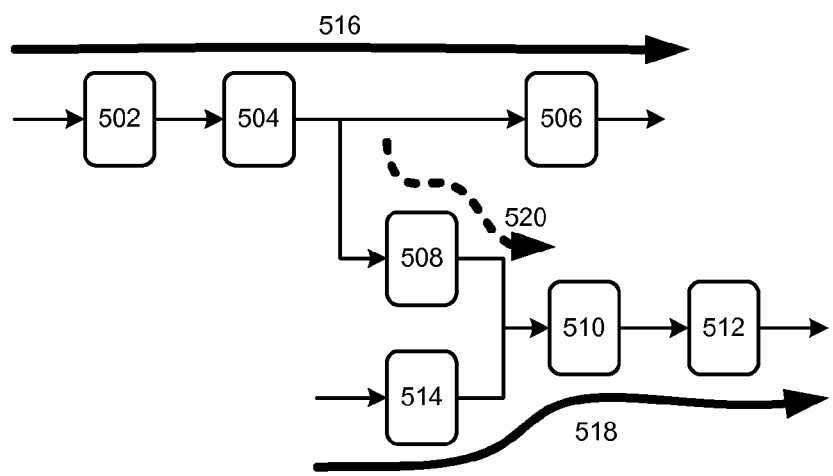
FIG. 5 illustrates why timing information does not need to be updated throughout the circuit when a circuit block is modified in an equal value segment in accordance with some embodiments of the present invention.

FIG. 5 illustrates why timing information does not need to be updated throughout the circuit when a circuit block is modified in an equal slack segment in accordance with some embodiments of the present invention.

The combinational circuit illustrated in FIG. 5 includes circuit blocks 502-514. Equal slack segments 516, 518, and 520 were created based on the slack values associated with the circuit block pins. Specifically, the slack values associated with equal slack segments 516 and 518 are worse than the slack value associated with equal slack segment 520. In some embodiments of the present invention, the system visits circuit blocks in equal slack segments 516 and 518 before visiting circuit blocks in equal slack segment 520. Note that, when the system visits circuit blocks in equal slack segment 520, the timing information at the endpoints of equal slack segment 520 has already been updated when the system visited equal slack segments 516 and 518.

The above disclosure describes embodiments of the present invention in the context of timing violations. However, it will be apparent to one of ordinary skill in the art that embodiments of the present invention can also be used for determining an order for visiting circuit blocks to fix any type of design requirement violation.

Figure 6A:
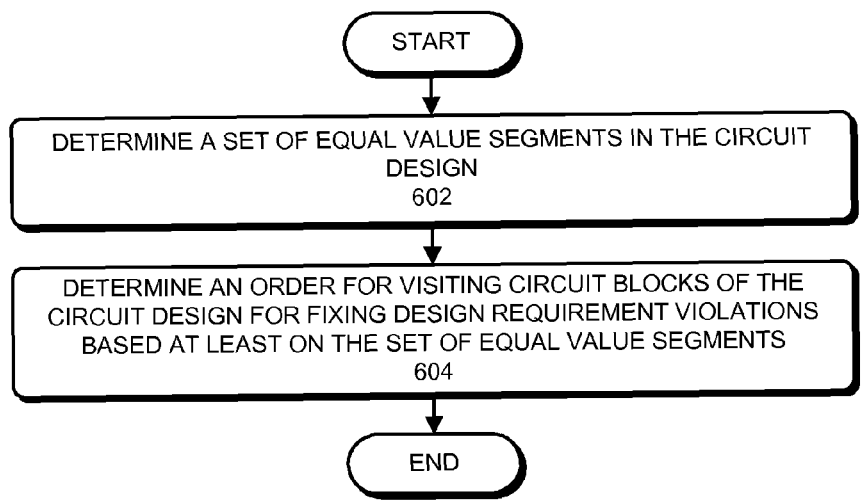
FIG. 6A presents a flowchart that illustrates a process for determining an order for visiting circuit blocks of a circuit design for fixing design requirement violations in accordance with some embodiments of the present invention.

FIG. 6A presents a flowchart that illustrates a process for determining an order for visiting circuit blocks of a circuit design for fixing design requirement violations in accordance with some embodiments of the present invention.

The process can begin by determining a set of equal value segments in the circuit design (step 602). Note that the circuit block pins or terminals in an equal value segment are associated with the same parameter value, wherein parameter values indicate an amount or degree of a design requirement violation. For example, in the case of timing violations, an equal value segment is an equal slack segment, a design requirement violation is a timing violation, and a parameter value associated with a pin is the timing slack value associated with the pin.

Next, the system can determine an order for visiting circuit blocks of the circuit design for fixing design requirement violations based at least on the set of equal value segments (step 604).

Figure 6B:
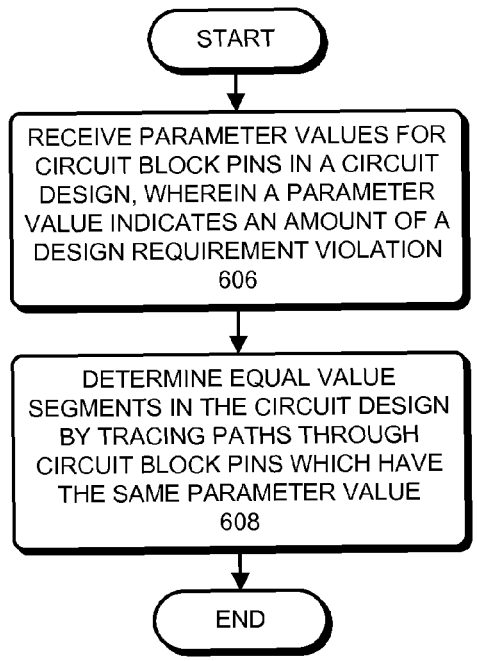
FIG. 6B presents a flowchart that illustrates a process for determining equal value segments in accordance with some embodiments of the present invention.

FIG. 6B presents a flowchart that illustrates a process for determining equal value segments in accordance with some embodiments of the present invention.

The process can begin by receiving parameter values for circuit block pins in a circuit design, wherein a parameter value indicates an amount of a design requirement violation (step 606). The parameter values associated with the pins can be determined by propagating parameter values through the circuit design using a technique that is similar to the static timing analysis technique illustrated in FIGS. 4A-4E. The parameter value associated with a pin can indicate the amount or degree of design rule check violations, noise violations, leakage violations, etc. For example, the design requirement violations can be timing violations, and the parameter values can correspond to the timing slack values. Alternatively, the design requirement violations can be noise violations (e.g., violations of noise tolerance levels), and the parameter values can correspond to noise levels.

Next, the system can determine equal value segments in the circuit design by tracing paths through circuit block pins which have the same parameter value (step 608). For example, the system can determine equal value segments as illustrated in FIG. 4E.

Figure 6C:
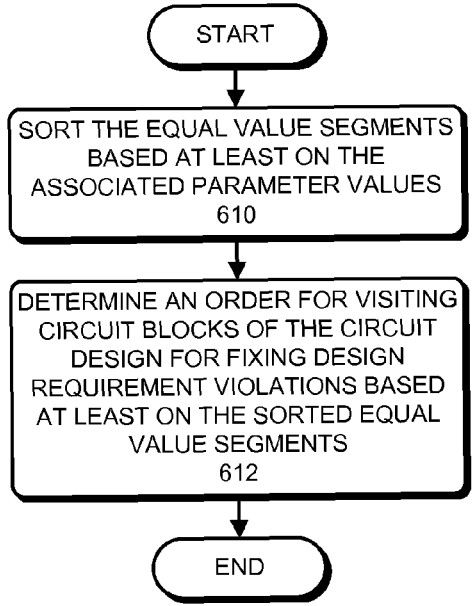
FIG. 6C presents a flowchart that illustrates a process for determining an order for visiting circuit blocks of a circuit design for fixing design requirement violations in accordance with some embodiments of the present invention.

FIG. 6C presents a flowchart that illustrates a process for determining an order for visiting circuit blocks of a circuit design for fixing design requirement violations in accordance with some embodiments of the present invention.

The process can begin by sorting the equal value segments based at least on the associated parameter values (step 610). Alternatively, the system can use a sorted data structure that maintains elements in a sorted order. For example, the system can use a self-balancing binary search tree, e.g., a red-black tree, to store the equal value segments. If the system uses such a data structure, the system does not need to perform a sorting operation.

Next, the system can determine an order for visiting circuit blocks of the circuit design for fixing design requirement violations based at least on the sorted equal value segments (step 612). Specifically, the system can visit circuit blocks in equal value segments that are associated with a higher degree, or a greater amount of violations before visiting circuit blocks in equal value segments that are associated with a lower degree or a lesser amount of violations.

For each equal value segment in the sorted list of equal value segments, the system can determine an order in which to visit the circuit blocks. For example, for fixing timing violations, the system may visit circuit blocks of an equal value segment in decreasing order of their slew. Note that any known or later developed technique can be used for determining an order for visiting circuit blocks in an equal value segment.

Variations in the manufacturing process can cause variations in the characteristics of a chip. Further, variations in the operating conditions (e.g., temperature, voltage, etc.) can also cause variations. Hence, circuit designers typically ensure that design requirements are satisfied for multiple corners which represent different manufacturing process conditions and/or different operating conditions. In conventional approaches, design requirement violations are identified and fixed for each corner separately. Such conventional approaches have at least two drawbacks. First, these approaches are slow because the system fixes design requirement violations for each corner separately. Second, these approaches are not aware of the global picture, i.e., when the system fixes a design requirement violation for a particular corner, the system does not have any awareness of whether it will fix violations in other corners.

Some embodiments of the present invention overcome these drawbacks by fixing design requirement violations for a set of corners at the same time. Specifically, the system creates equal value segments for each corner. Next, the system combines the equal value segments across the multiple corners to create a master set of equal value segments. The system can then use the master set of equal value segments to determine an order for visiting the circuit blocks for fixing design requirement violations.

Figure 7A:
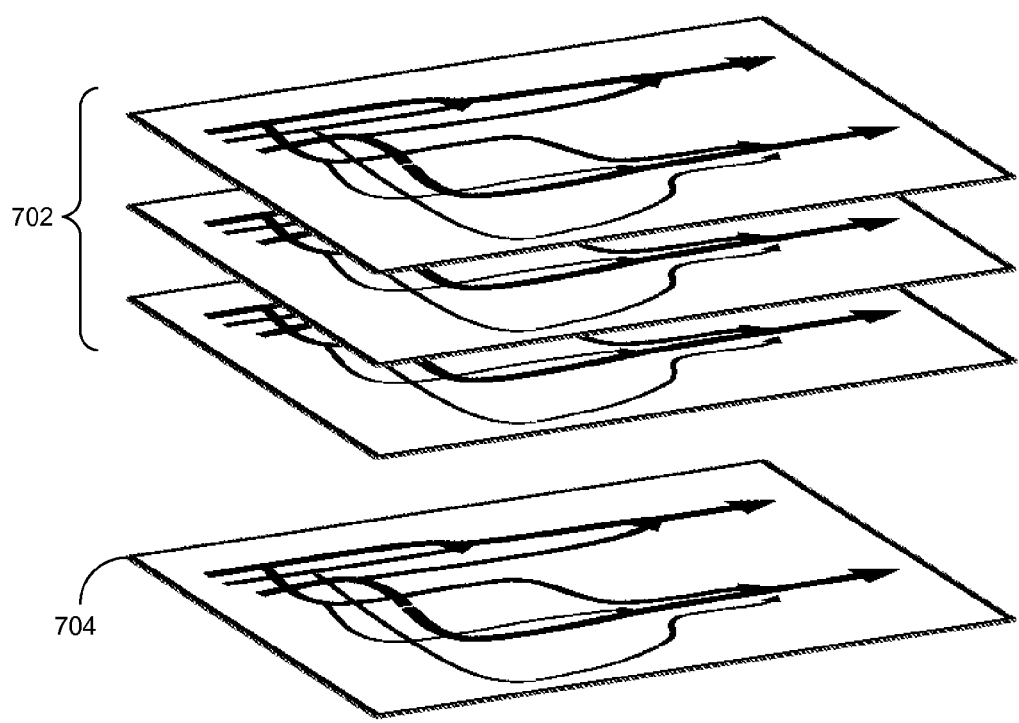
FIGS. 7A-7B illustrate how equal value segments for multiple corners can be combined in accordance with some embodiments of the present invention.
Figure 7B:
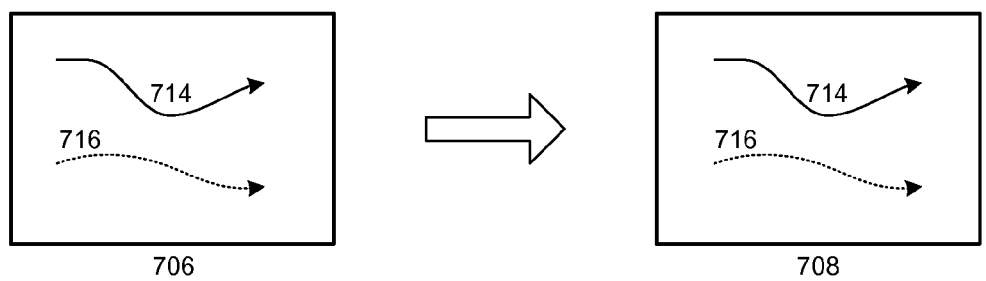
Figure 7B:
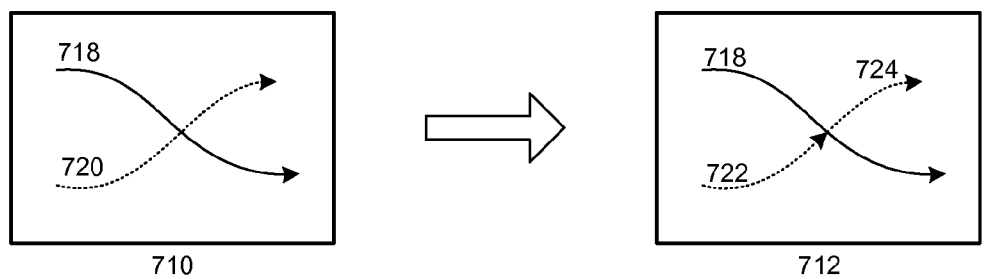

FIGS. 7A-7B illustrate how equal value segments for multiple corners can be combined in accordance with some embodiments of the present invention.

In FIG. 7A, panels 702 illustrate equal value segments in a circuit design for multiple corners. The equal value segments shown in panels 702 can be superimposed to obtain the master set of equal value segments shown in panel 704.

In FIG. 7B, panel 706 illustrates equal value segments 714 and 716 which correspond to multiple corners, and which need to be superimposed to create the master set of equal value segments. Since equal value segments 714 and 716 do not intersect, both of these equal value segments can be added directly, i.e., without any changes, to the master set of equal value segments as shown in panel 708.

Note that, if two equal value segments which correspond to different corners pass through exactly the same set of pins, the equal value segment with the worse parameter value can be added to the master set of equal value segments. For example, suppose equal value segments A and B both pass through exactly the same set of pins, and the timing slack values associated with A and B are −2 and −4, respectively. In this case, the system will store equal value segment B in the master set of equal value segments because equal value segment B has a worse slack value. The equal value segment A will not be stored in the master set of equal value segments. Note that, when the system fixes the timing violations for equal segment B, it will automatically fix the timing violations for equal segment A.

Panel 710 includes equal value segments 718 and 720 which correspond to different corners. Note that equal value segments 718 and 720 intersect. The equal value segment with the worse parameter value can be added to the master set of equal value segments, and the other equal value segment can be split into two equal value segments, with each piece then being added to the master set of equal value segments. For example, suppose the parameter value associated with equal value segment 718 is worse than the parameter value associated with equal value segment 720. In this case, the system can add equal value segment 718 to the master set of equal value segments. Further, the system can split equal value segment 720 into pieces 722 and 724 as shown in panel 712, and then add pieces 722 and 724 to the master set of equal value segments. Note that pieces 722 and 724 are equal value segments with the same parameter value.

Figure 8:
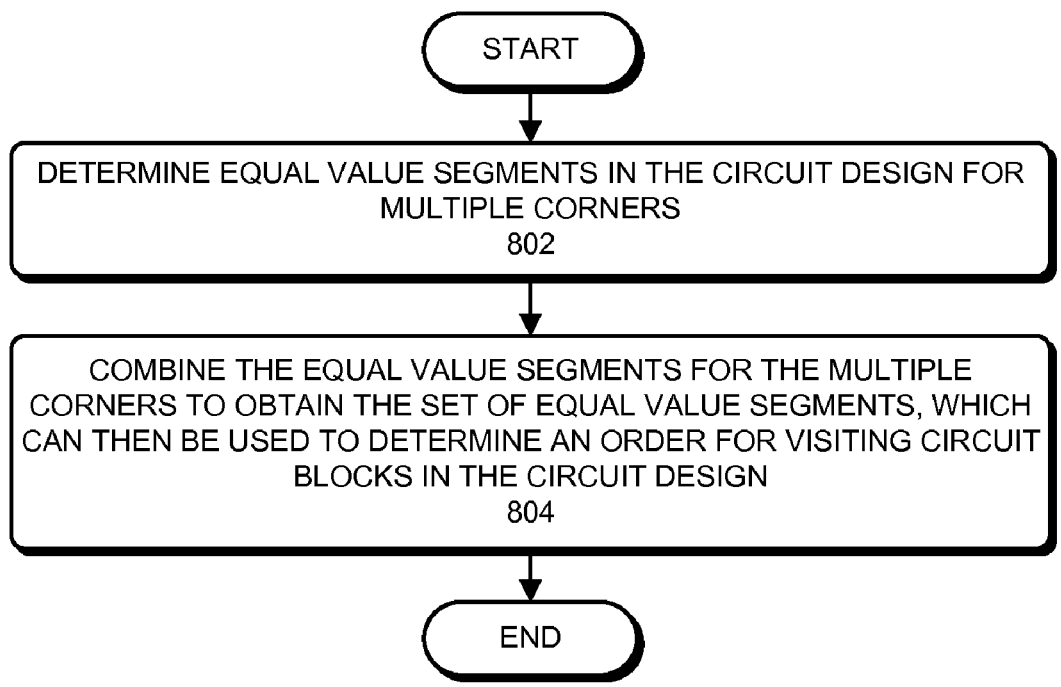
FIG. 8 presents a flowchart that illustrates a process for combining equal value segments for different corners in accordance with some embodiments of the present invention.

FIG. 8 presents a flowchart that illustrates a process for combining equal value segments for different corners in accordance with some embodiments of the present invention.

The process can begin by determining equal value segments in the circuit design for multiple corners (step 802).

Next, the system can combine the equal value segments for the multiple corners to obtain a master set of equal value segments, which can then be used to determine an order for visiting circuit blocks in the circuit design (step 804). For example, the system can combine the multiple sets of equal value segments as explained in FIGS. 7A-7B.

Figure 9:
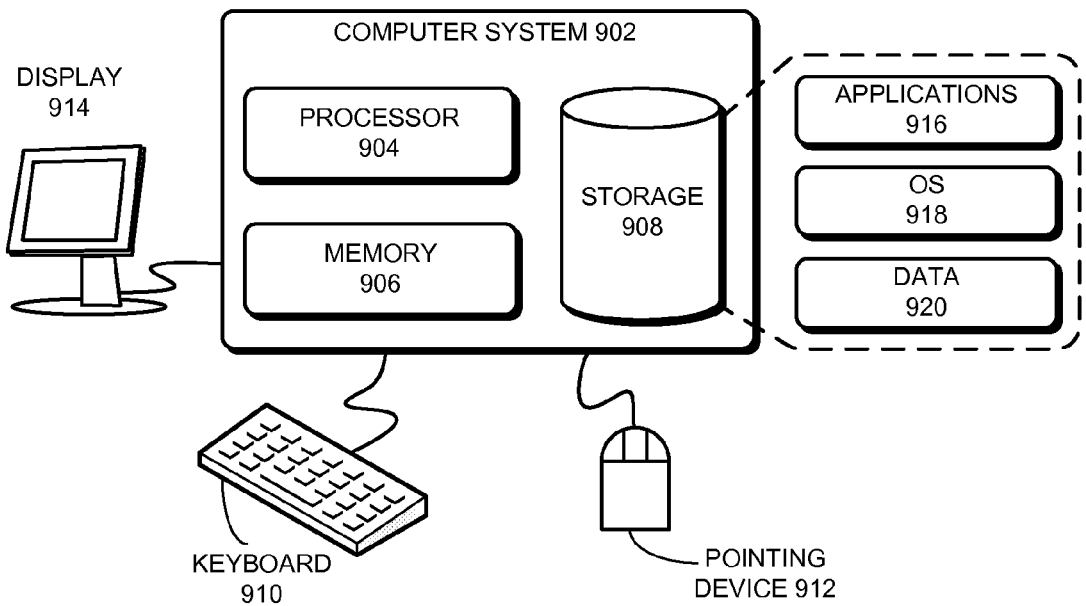
FIG. 9 illustrates a computer system in accordance with some embodiments of the present invention.

FIG. 9 illustrates a computer system in accordance with some embodiments of the present invention.

A computer or computer system can generally be any system that can perform computations. Specifically, a computer can be a microprocessor based system which may include multiple processing cores, a network processor based system, a digital signal processor based system, a portable computing device, a personal organizer, a distributed computing platform based system, or any other computing system now known or later developed.

Computer system 902 comprises processor 904, memory 906, and storage 908. Computer system 902 can be coupled with display 914, keyboard 910, and pointing device 912. Storage 908 can generally be any device that can store data. Specifically, a storage device can be a magnetic, an optical, or a magneto-optical storage device, or it can be based on flash memory and/or battery-backed up memory. Storage 908 can store applications 916, operating system 918, and data 920. Applications 916 can include instructions that when executed by computer 902 cause computer 902 to perform one or more processes described in this disclosure. Data 920 can include parameter values, equal value segments, or any data that is inputted or outputted by one or more processes described in this disclosure.

Figure 10:
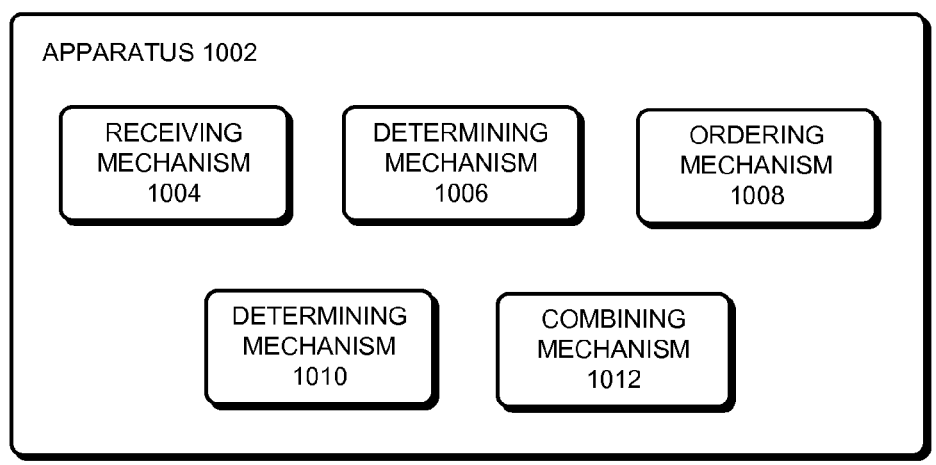
FIG. 10 illustrates an apparatus in accordance with some embodiments of the present invention.

FIG. 10 illustrates an apparatus in accordance with some embodiments of the present invention.

Apparatus 1002 can comprise a number of mechanisms which may communicate with one another via a wired or wireless communication channel. Apparatus 1002 may be realized using one or more integrated circuits. Apparatus 1002 may be integrated with a computer system, or it may be realized as a separate device which is capable of communicating with other computer systems and/or devices. Specifically, apparatus 1002 can comprise receiving mechanism 1004, determining mechanism 1006, ordering mechanism 1008, determining mechanism 1010, and combining mechanism 1012.

In some embodiments, receiving mechanism 1004 can be configured to receive parameter values for circuit block pins in a circuit design, wherein a parameter value indicates an amount of a design requirement violation. Determining mechanism 1006 can be configured to determine equal value segments in the circuit design, wherein circuit block pins in an equal value segment have the same parameter value. Ordering mechanism 1008 can be configured to order the equal value segments based at least on the associated parameter values. For example, ordering mechanism 1008 can sort the equal value segments based on the associated parameter values. Determining mechanism 1010 can be configured to determine an order for visiting circuit blocks of the circuit design for fixing design requirement violations based at least on the ordered equal value segments.

In some embodiments, receiving mechanism 1004 can be configured to receive equal value segments for multiple corners. Combining mechanism 1012 can be configured to combine the equal value segments to obtain a master set of equal value segments.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining an order for visiting circuit blocks of a circuit design for fixing design requirement violations, the method comprising:
   determining, by computer, a set of equal value segments in the circuit design based on a parameter value associated with circuit block pins, wherein circuit block pins in each equal value segment are associated with the same parameter value, wherein at least two equal value segments are associated with different parameter values, wherein parameter values indicate an amount or degree of a design requirement violation, and wherein determining the set of equal value segments comprises tracing paths through circuit block pins which are associated with the same parameter value; and
   determining an order for visiting circuit blocks of the circuit design for fixing design requirement violations based at least on the set of equal value segments, wherein determining the order for visiting circuit blocks includes sorting the set of equal value segments based at least on the associated parameter values.

2. The method of claim 1, wherein the design requirement violations are timing violations.

3. The method of claim 2, wherein the parameter values are slack values.

4. The method of claim 3, wherein the slack values are determined by performing static timing analysis on the circuit design.

5. The method of claim 1, wherein the design requirement violations are noise violations.

6. The method of claim 5, wherein the parameter values are noise values.

7. The method of claim 1, wherein determining the set of equal value segments in the circuit design includes:
   determining equal value segments in the circuit design for multiple corners; and
   combining the equal value segments for the multiple corners to obtain the set of equal value segments.

8. A non-transitory computer-readable storage medium storing instructions that when executed by a computer cause the computer to perform a method for determining an order for visiting circuit blocks of a circuit design for fixing design requirement violations, the method comprising:
   determining a set of equal value segments in the circuit design based on a parameter value associated with circuit block pins, wherein circuit block pins in each equal value segment are associated with the same parameter value, wherein at least two equal value segments are associated with different parameter values, wherein parameter values indicate an amount or degree of a design requirement violation, and wherein determining the set of equal value segments comprises tracing paths through circuit block pins which are associated with the same parameter value; and determining an order for visiting circuit blocks of the circuit design for fixing design requirement violations based at least on the set of equal value segments, wherein determining the order for visiting circuit blocks includes sorting the set of equal value segments based at least on the associated parameter values.

9. The non-transitory computer-readable storage medium of claim 8, wherein the design requirement violations are timing violations.

10. The non-transitory computer-readable storage medium of claim 9, wherein the parameter values are slack values.

11. The non-transitory computer-readable storage medium of claim 10, wherein the slack values are determined by performing static timing analysis on the circuit design.

12. The non-transitory computer-readable storage medium of claim 8, wherein the design requirement violations are noise violations.

13. The non-transitory computer-readable storage medium of claim 12, wherein the parameter values are noise values.

14. The non-transitory computer-readable storage medium of claim 8, wherein determining the set of equal value segments in the circuit design includes:

determining equal value segments in the circuit design for multiple corners; and combining the equal value segments for the multiple corners to obtain the set of equal value segments.

15. An apparatus for determining an order for visiting circuit blocks of a circuit design for fixing design requirement violations, the apparatus comprising:

one or more processors; and a computer-readable storage medium storing instructions executable by the one or more processors, wherein the instructions include:

instructions for determining a set of equal value segments in the circuit design based on a parameter value associated with circuit block pins, wherein circuit block pins in each equal value segment are associated with the same parameter value, wherein at least two equal value segments are associated with different parameter values, wherein parameter values indicate an amount or degree of a design requirement violation, and wherein determining the set of equal value segments comprises tracing paths through circuit block pins which are associated with the same parameter value; and instructions for determining an order for visiting circuit blocks of the circuit design for fixing design requirement violations based at least on the set of equal value segments, wherein determining the order for visiting circuit blocks includes sorting the set of equal value segments based at least on the associated parameter values.

16. The apparatus of claim 15, wherein the design requirement violations are timing violations.

17. The apparatus of claim 15, wherein the design requirement violations are noise violations.

18. The apparatus of claim 15, wherein the instructions for determine further include:

instructions for determining equal value segments in the circuit design for multiple corners; and instructions for combining the equal value segments for the multiple corners to obtain the set of equal value segments.

* * * * *